United States Patent

Dickopp

[15] 3,691,317

[45] Sept. 12, 1972

[54] PRESSURE RESPONSIVE PLAYBACK DEVICE FOR MECHANICALLY RECORDED SIGNALS

[72] Inventor: Gerhard Dickopp, D-1 Berlin, 28, Germany

[73] Assignee: TED Bildplatten Aktiengesellschaft Aeg-Telefunken Teldec Zug, Switzerland

[22] Filed: May 11, 1971

[21] Appl. No.: 142,237

Related U.S. Application Data

[63] Continuation-in-part of Ser. No. 87,064, Nov. 5, 1970.

[30] Foreign Application Priority Data

May 13, 1970 Germany..........P 20 24 539.0

[52] U.S. Cl.........................179/100.41 P, 178/6.6 A

[51] Int. Cl. ..........................................H04r 17/04

[58] Field of Search.179/100.4 R, 100.4 ST, 100.41 P, 179/100.41 B, 100.41 K; 310/8; 178/6.6 A

[56] References Cited

FOREIGN PATENTS OR APPLICATIONS 871,595 6/1961 Great Britain ...........179/1 ST

OTHER PUBLICATIONS

World Premiere, Video Disk, FIG. 4 after page 23, 6/70

*Primary Examiner*—Bernard Konick
*Assistant Examiner*—Raymond F. Cardillo, Jr.
*Attorney*—Spencer & Kaye

[57] ABSTRACT

A playback head for use with a record disc containing grooves whose walls undulate to constitute a spatial representation of the time variation of a signal to be reproduced, the head carrying a stylus which engages in the groove and elastically deforms the groove walls to a substantial degree, the playback head being arranged to produce an output proportional to the reaction force exerted on the stylus by the elastically deformed groove walls, the stylus being formed to have a shallow leading edge which extends in the direction of the groove axis to contact the groove walls for a distance equal to a plurality of wavelengths of the recorded signal and a steep trailing edge which contacts the groove walls for a distance no greater than one half of a wavelength of the recorded signal, the leading and trailing edges meeting at the lowermost point of the stylus, and a lowpass filter being connected to the head output for attenuating frequencies greater than twice the lowest recorded frequency.

14 Claims, 5 Drawing Figures

Inventor:
Gerhard Dickopp
BY Spencer & Kaye
ATTORNEYS.

PRESSURE RESPONSIVE PLAYBACK DEVICE FOR MECHANICALLY RECORDED SIGNALS

CROSS-REFERENCE TO RELATED APPLICATION

This is a continuation-in-part of my application Ser. No. 87,064, filed on Nov. 5th 1970, and entitled RECORD DISC.

BACKGROUND OF THE INVENTION

The present invention relates to a pickup head for playing back record discs, particularly discs of the type described in my above-cited copending application.

The information to be reproduced is stored in the grooves of such discs in the form of undulations of the groove walls which constitute a spatial representation of the time variation of the signal to be reproduced. The physical characteristics of the disc and the force applied by the pickup are such that the stylus of the pickup head elastically deforms the groove walls to a substantial degree and the resulting elastic restoring force exerted on the stylus is sensed by the pickup head and converted into an electrical signal proportional to such force. The transducer element for effecting such conversion can be of the piezoelectric or magnetostrictive type. The groove walls can be contacted either directly or through the intermediary of a substantially rigid coupling element.

In this connection, pickups have already been proposed for reproducing very high frequency signals, i.e. signal frequencies which are substantially greater than those stored in commercially available sound recordings. The proposed pickup devices could be employed, for example, to reproduce images which have been transformed into video signals and recorded in a manner similar to that presently employed for sound recordings. In this case, the pickup must be capable of reproducing signals having frequencies in the megahertz range stored on the disc.

For this purpose, it has been proposed in copending U.S. Application Ser. No. 144,116, filed by Eduard Schüller, Gerhard Dickopp, Horst Redlich and Hans-Joachim Klemp on May 17, 1971, and entitled PRESSURE PICKUP TRANSDUCER FOR MECHANICALLY STORED SIGNALS (corresponding to German Application No. P 20 25 032.2 of May 15th, 1970), to design the piezoelectric or magnetostrictive transducer element, as a small prismatic body having the form of a parallelepiped, such as a cube, for example, which produces an output proportional to variations in its thickness. It has a dimension in the direction toward the support which is smaller than one half the wavelength of a mechanical oscillation produced therein at the upper limit frequency of the recorded signals which are to be reproduced.

Known ceramic materials such as lead-zirconate-titanate or potassium-sodium-niobate are especially well suited for use as the transducer since their frequency constants permit the transducer to be given dimensions which permit relatively simple fabrication.

On first consideration, it might appear that in order to accurately reproduce the recorded frequencies here of interest, it would be necessary to design the pickup stylus in a manner similar to that employed for playing back sound recordings so that at any given instant the stylus contacts only a fraction of one wavelength of the recorded signal. However, when a record disc contains a recorded video signal, the width of the groove can be of the order of 10 $\mu$ (microns) and the recorded signal has wavelengths as short as 3 $\mu$. As a result, it is as a practical matter impossible to utilize a stylus whose tip is so small as to contact the groove walls over a distance which is less than one half the shortest recorded wavelength. Even if a tracking force of only 0.5 g were employed, the contact pressure of such a stylus tip would far exceed the resistance strength limit of the record disc material. In addition, such a sharp stylus tip would act as a cutting tool to shear off the peaks of the groove undulations.

Moreover, during the playback of the high frequencies contained in a video signal, such a stylus would not be able to track the groove undulations due to the inertia of the playback head. As a result, the peaks of the groove undulations would be elastically deformed by the stylus and this would lead to distortions in the playback signal.

As a result, it has already been proposed, as disclosed in U.S. Application Ser. No. 798,709, filed by Gerhard Dickopp, Hans-Joachim Klemp, Horst Redlich and Eduard Schüller on Feb. 12th, 1969, entitled System for Reproducing Mechanically Recorded Signals, and issued on Mar. 28th, 1972 as U.S. Pat. No. 3,652,809, to employ a playback stylus which is formed to rest on a length of the groove walls which is longer than the longest recorded wavelength, the stylus end which contacts the record groove having a front side and a rear side, the edge of the front side and the edge of the rear side lying in a plane passing through the stylus perpendicular to the surface of the record disc and parallel to the direction of relative motion between the stylus and the disc and being of unequal steepnesses with respect to the surface of the record disc. Because this stylus rests on a plurality of undulation peaks, the wear of both the record surface and the stylus tip is reduced. The force on the stylus tip is in this case proportional to the sum of the forces exerted by the individual contacting undulation peaks.

The resulting alternating component of the force on the stylus tip is directly proportional to the degree of asymmetry between the inclinations of the front and rear side edges. This force reaches a maximum value when the rear side edge has a vertical inclination. Therefore, this edge should be at right angles to the surface of the record disc, whenever possible. Somewhat smaller inclination angles will produce a similar result.

In a playback system of the type under consideration, the effective mass of the playback head is so great that it will not undergo any substantial movement perpendicular to the record disc surface in response to the alternating force applied thereto by the groove wall undulations at the recorded frequency, which in the case of video signals is of the order of several megahertz. Under these conditions, a problem occurring during playback involves the fact that the bottom of the stylus contacts the groove walls over several wavelengths of the recorded signal, so that a plurality of undulation peaks contribute to the resultant force acting on the playback head.

If the front side edge and rear side edge of the lower end of the stylus are given respectively different inclinations, it can occur, as will be explained in detail below, that the resultant force on the stylus will correspond, to a first approximation, to that produced by the incremental groove portion below a predetermined point along the lower end of the stylus. It has been found advisable, in order to reduce the wear experienced by both the stylus and the record disc surface, to give the front side, or leading, edge of the stylus lower end a shallow inclination.

When playing back a disc recording using a stylus of the above-described type, distortions are introduced which adversely influence the quality, or fidelity, of the resulting signal reproduction.

SUMMARY OF THE INVENTION

It is a primary object of the present invention to eliminate, or at least substantially reduce, such distortions.

A more specific object of the invention is to provide a playback system which provides an output signal constituting an accurate representation of the recorded signal.

A further specific object of the invention is to eliminate distortion created by the presence in the playback signal of high frequency components not contained in the recorded information.

The present invention is based on a system including a pressure playback head having a stylus of a wear-resistant material and a transducer element and arranged for scanning the groove undulations of a record disc which is moved relative to it, the pressure playback head being in contact with the carrier over more than one wavelength of the deformations in the direction of the groove and the record surface being elastically deformed by the stylus. The stylus has a cross-sectional profile, in a plane parallel to the record groove and perpendicular to the carrier surface, which is constituted by leading and trailing edges having respectively different steepnesses.

Objects according to the present invention are achieved by the provision, in a system including a playback stylus whose lower surface is shaped, in a plane parallel to the groove axis, to have leading and trailing edges of respectively different inclinations to the carrier surface, of a lowpass filter connected to the stylus transducer and having an upper cutoff frequency of no greater than twice the lowest instantaneous frequency of the signal to be reproduced.

In a system according to the present invention, the trailing edge of the stylus has a steep inclination, i.e. it is so designed that it will contact the groove walls over a distance which is no greater than one half the shortest recorded wavelength.

The leading edge of the stylus has a much shallower inclination so that it contacts a plurality of wavelengths of the recorded signal and so that the alternating pressure along the leading edge due to the groove wall undulations gradually increases in a direction toward the stylus tip vertex, after which such pressure is rapidly reduced.

DESCRIPTION OF THE PREFERRED EMBODIMENTS

Figure 1:
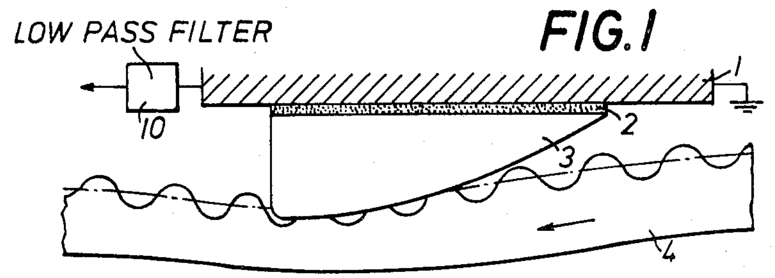
FIG. 1 is a cross-sectional view illustrating one embodiment of a system according to the invention with the stylus in contact with a record disc groove.

FIG. 1 illustrates a first embodiment of the system according to the invention with the stylus in contact with a groove formed in record disc 4 and having its walls provided with undulations corresponding to the recorded signal. The playback head carrying the stylus is caused to bear against the disc with a force sufficient to elastically deform the record disc, and to cause the undulation peaks to be compressed beneath the stylus, in the manner illustrated in the drawing. The direction of movement of the record disc 4 relative to the stylus 3 is shown by the arrow.

The playback head consists of a transducer body 1, which is preferably a piezoelectric ceramic body, to which the playback stylus 3, which may be of sapphire or diamond, is rigidly fastened by a glue or solder joint 2. When the record disc is caused to move relative to the stylus 3, the resultant reaction force applied by the elastically deformed disc to the stylus 3 is applied to ceramic body 1 and converted by suitable circuitry connected to the body into a corresponding output signal. This force alternates at a rate determined by the recorded wavelength and only its average value is determined by the bearing force with which the stylus is applied against the record disc.

In order to give an overall impression of the effectiveness of the means according to the present invention, reference shall be made, at first summarily, to FIGS. 1 to 5.

Figure 2:
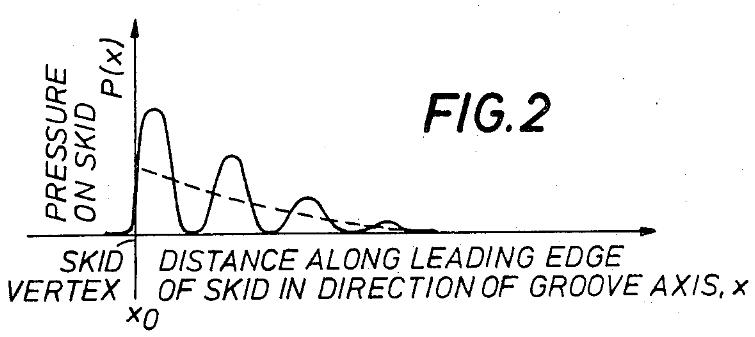
FIG. 2 is a waveform diagram of the pressure exerted on the stylus of FIG. 1 by the groove walls.
Figure 4:
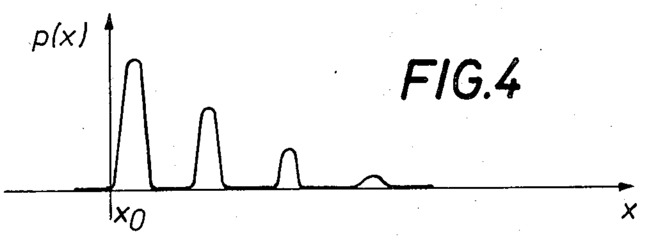
FIG. 4 is a waveform illustrating the variation in pressure along the stylus in the case of a practical embodiment of the invention.

Under ideal conditions, i.e. when the waveform of the groove undulations is purely sinusoidal and these undulations are completely elastically flattened under the influence of the contact force of the scanner, a scanner having the form shown in FIG. 1 will produce approximately the pressure distribution $p$ (x) of FIG. 2 along the contact line $x$ of the scanning stylus in the direction of the groove axis, measured from approximately the left-hand edge of stylus 3, as shown in FIG. 1 and designated with the coordinate value $x_o$ in FIGS. 2 and 4.

Figure 3:
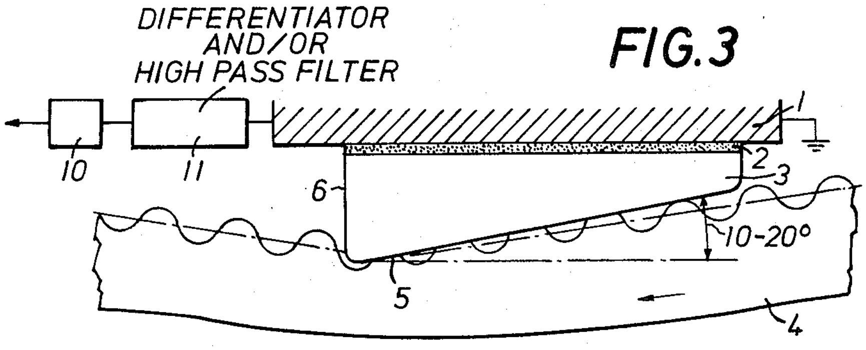
FIG. 3 is a view similar to that of FIG. 1 showing another embodiment of the invention.

As indicated in FIGS. 1 and 3, with the conventional synthetic materials employed for such record discs, it generally does not happen that the peaks of the undulations in the disc groove, which undulations correspond to the recorded signal, are elastically completely leveled under the influence of the bearing force of the playback head. Consequently, the pressure distribution along the lower surface of the stylus is not purely sinusoidal, but rather contains a large harmonic component as shown, for example, in FIG. 4.

Figure 5:
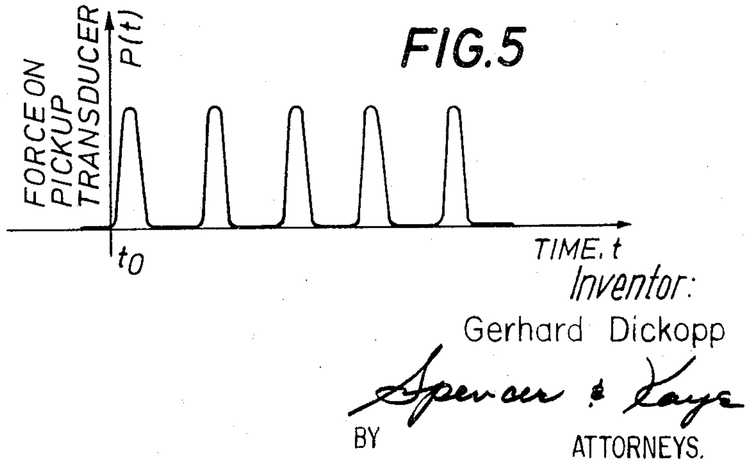
FIG. 5 is a force vs. time waveform of the output signal from a playback head according to the invention when the pressure relation shown in FIG. 4 exists.

When the conditions illustrated in FIGS. 1 and 4 are assumed, the resulting time alternating component P (t) of the reaction force on the pickup, is produced as shown in FIG. 5 — beginning with the point in time $t_o$ — while the stylus moves along the record groove and compresses the recorded groove undulations. When this resulting alternating force component is converted by the mechanical-electrical transducer element of the pickup head into a proportional electrical voltage, the harmonics contained therein can have a distorting effect on the reproduced signal. For this reason the harmonics are suppressed by a conveniently designed lowpass filter. In order to suppress as few as possible of the upper side band frequencies of the modulated signal, the upper limit frequency of the lowpass filter should be placed in the proximity of a frequency equal to twice the lowest instantaneous frequency of the recorded signal.

The signal value may be a sinusoidal angularly modulated signal, preferably a frequency modulated signal. In this case the upper limit frequency of the lowpass filter should lie in the vicinity of, or below, twice the lowest instantaneous frequency occurring during angular modulation. With frequency modulation this lowest instantaneous frequency corresponds to the lowest frequency of the frequency excursion range.

In order to be able to provide a clearer understanding of the improvements according to the present invention, a more detailed consideration of the processes occurring during playback will be presented. This will relate, for purposes of explanation, to a frequency modulated recording which has a constant amplitude.

The development of the alternating component of the undulations in the groove walls of the carrier corresponding to the recorded signal is given by the function $y$ for a given instant. Then $$y=\hat{y}\cdot\sin(k\cdot x) \qquad 1.$$

where $y$ denotes the amplitude of the alternating portion of the groove wall undulations;

$x$ the coordinate in the direction of the groove axis;

$k$ the number of cycles of the recorded carrier wave at the point of stylus contact, k being subject to local variation in the case of frequency modulation.

With the conditions illustrated in FIG. 1, a pressure development will result along the lower surface of the pickup skid 3, which pressure is illustrated approximately in FIG. 2. This pressure $p(x)$ may be mathematically determined to a first approximation by the following function in the range of interest:

$$p(x)=\hat{p}_o\cdot e^{-a(x-x_o)}(1+\sin kx) \qquad 2.$$

where $x_o = x = \infty$ where $x_o$ denotes the locus of the pickup edge vertex of the stylus tip, i.e. the region between the leading and trailing edges, this locus being variable, as seen from the support, due to the relative motion between the playback head and the support and, at constant scanning velocity, being proportional to time;

$p_o$ the amplitude of the alternating pressure in the immediate proximity of the stylus tip vertex;

$a$ the coefficient of the steepness of the $e$-function.

Equation (2) can be expanded to yield:

$$p(x)=\hat{p}_o e^{-a(x-x_o)}+\hat{p}_o e^{-a(x-x_o)}\sin kx \qquad 2a.$$

which illustrates the physical fact that both terms of the sum of the average pressure and the heterodyne amplitude of the alternating pressure reach a maximum in the proximity of the tip vertex ($x = x_o$) and will slope down gradually in the positive $x$ direction.

In case of a modulation assumed to be sinusoidal and having the number of waves $$k=k_o+k_1\cdot\sin mx$$

with the constants $k_o$, $k_1$ and $m$, $m$ being a number of waves denoting the video signal having a low frequency as compared with the carrier wave, the alternating component P of the resultant force on the playback head is determined by integrating the second term of equation (2a) over the bearing area to yield:

$$P_{\sim}=\hat{p}_o\cdot l\int_{x_o}^{L} e^{-a(x-x_o)}\sin(k_o+k_1\sin mx)\times dx \qquad (4)$$

where $l$ is the effective track width, $l\cdot dx$ therefore being an element of the bearing area;

L is the length of the stylus leading edge in contact with the groove.

P~ is a function of $x_o$ (the locus of the pickup vertex) and of the effective playback head length L. It will be seen that if the bearing length L is longer than one wavelength of the recorded signal, the value of the integral is no longer changed essentially if the upper limit of integration is equated with ∞ for simplifying the calculation.

Although this resulting alternating force P~ does not correspond exactly to the signal recorded on the carrier, which, by combining equations (1) and (3) can be represented as:

$$y=\hat{y}\cdot\sin(k_o+k_1\sin mx)\,x$$

a video signal recorded, for example with frequency modulation, can be reproduced with a pressure pickup with sufficient fidelity even when this pressure pickup performs a proportional conversion of the alternating force action thereon into an electrical signal.

The fidelity of the reproduction can be improved, however, if the pressure pickup together with the networks connected thereto is adapted for converting the resulting alternating force acting on the pickup into a signal which is approximately proportional, at least in the range of its low frequency components, to the first derivative with respect to time of the alternating force.

The time differentiation of the voltage produced at the output of the pickup due to the alternating force P~ contributes to an accurate reproduction of the original signal after scanning. Mathematically, this procedure corresponds to a differentiation of equation (4) with respect to the lower limit $x_o = v\cdot t$, where $v$ = relative speed between playback head and the record groove, and $t$ = time. According to the reference work Hütte I, 28th edition, page 107, paragraph 5, this differentiation gives:

$$\frac{dP_{\sim}(x_o)}{dx_o}=-l\hat{p}_o\left(\sin(k_o+k_1\sin mx_o)x_o - \int_{x_o}^{\infty} ae^{-a(x-x_o)}\sin(k_o+k_1\sin mx)\times dx\right) \qquad (5)$$

The integral contained in this equation corresponds to the integral of equation (4), except for the constant $a$, so that $$\frac{dP_{\sim}}{dx_o}=aP_{\sim}-\hat{p}_o l\sin(k_o+k_1\sin mx_o)x_o \qquad (6)$$

The first part, a P~, may be neglected as compared with the second part, $\hat{p}_o l \sin (k_o + k_1 \sin mx_o)x_o$, if $a << k$ or $a << k_o - k_1$. This will be illustrated by the especially clear example of low modulation, i.e. $(k_o + k_1 \sin mx_o) \simeq k$:

For constant $k$, there can be derived:

$$P_\sim = \hat{p}_o l \int_{x_o}^{L\to\infty} e^{-a(x-x_o)} \sin kx dx$$

According to Hütte I, 28th edition, page 96, No. 34, it follows:

$$P_\sim \doteq \frac{-\hat{p}_o l e^{-a(x-x_o)}}{a^2+k^2}[a \sin kx + k \cos kx]$$

or $$P_\sim = \frac{+\hat{p}_o l[a \sin kx_o + k \cos kx_o]}{a^2+k^2}$$

Thus, $$\frac{dP_\sim}{dx_o} = \frac{+\hat{p}_o l}{a^2+k^2}[ak \cos kx_o - k^2 \sin kx_o]$$

If $a << k$, this can be reduced to:

$$\frac{dP_\sim}{dx_o} = -\hat{p}_o l \sin kx_o$$

Therefore, $$\frac{dP_\sim}{dx_o} = -\hat{p}_o l \sin (k_o + k_1 \sin mx_o) x_o$$

i.e., $(dP\sim)/(dx_o)$ is proportional to the original signal set forth in equation (1).

With a constant relative speed v between the scanner and the disc groove this means that the first time derivative of the alternating force P~ must be obtained in order to reproduce the original signal as accurately as possible.

When the mechanical-electrical transducer element of the pickup converts the alternating force resulting from the reaction force of the record disc on the scanning stylus into an approximately proportional electrical signal, the first derivative can be produced by a network connected to the pickup output to differentiate the electrical signal produced during scanning and before demodulation.

The differentiating circuit for the output signal also serves to attenuate the low frequency components of that signal which is desired for other reasons as well. This additional effect can also be obtained with the aid of a highpass filter whose limit frequency lies below, and in the vicinity of, the first lower side band frequency corresponding to the highest modulating frequency, e.g. the highest value of the video frequency utilized to modulate the recorded signal. Accordingly, a highpass filter may be connected to the transducer element for attenuating the low frequency components which are contained in the electrical signal produced during scanning.

The differentiation circuit or the highpass filter can be produced with the lowest cost by using the capacitance of the pickup as a part thereof. In the electrical equivalent circuit of the transducer element of the pickup, this capacitance is connected in series, as the internal resistance of the transducer element, with a voltage source representing the voltage produced by the element. It is therefore sufficient to connect an ohmic resistor, which is dimensioned according to the required relationship, with the above-mentioned capacitance by connecting it to the electrodes of the transducer element. This resistor may then form, together with the capacitance, an R-C differentiation circuit or highpass filter. If a highpass filter with a defined pass limit is connected with the pressure playback head for scanning a signal angularly modulated with the video signal, the limit frequency of this filter should be placed above 50 kc/s, but below the lowest instantaneous frequency of the angularly modulated signal. With frequency modulation the lowest instantaneous frequency corresponds to the lower limit of the frequency excursion range of the frequency-modulated oscillation.

The assumption made earlier that $a << k$ clearly indicates that both the average pressure and the alternating pressure peaks may decrease only gradually as a function of $x$, which had been assumed in FIG. 2 according to the case illustrated in FIG. 1.

It may now be shown generally that the alternating pressure peaks need not necessarily die out according to an exponential function, as had been assumed in equation (2), but any gradual decrease may be permitted. This is the case if the pickup skid possesses only one steep edge. "Steep" in this connection means, as noted earlier, that the trailing edge of the stylus is so designed that the groove walls do not contact that edge for a distance of greater than one-half the shortest record wavelength, whenever possible. The other edge of the stylus — in the exemplified embodiment shown in FIG. 1 the leading edge — is designed in such a way that a gradual rise of the alternating pressure up to the trailing "sharp" edge will result. This pressure will die out extraordinarily rapidly beyond the vertex between the leading and trailing edges.

The desired result can be obtained in practice either by a design of the pickup skid, as shown in FIG. 1, or by a design including a straight leading edge 5 which is slightly inclined towards the surface of the carrier, as shown in FIG. 3, which differs from FIG. 1 only in this respect. The trailing edge 6 of the stylus is vertical. The angle formed between the leading edge of the pickup skid and the undeflected surface of the support should preferably be between 10° and 20°, and may be as small as about 1°.

In the case of a pickup stylus, or skid, with a curved design as shown in FIG. 1, good results have been obtained by giving the leading edge a large radius of curvature in a plane containing the groove axis, the radius being greater than about five times the largest recorded wavelength, while the radius of curvature of the trailing edge at the stylus tip vertex is smaller than one-half the shortest recorded wavelength.

As has already been mentioned, the plastics commonly used for the carrier in general do not permit the undulation peaks in the surface of the grooves provided in the carrier and corresponding to the recorded signal to be completely levelled elastically under the influence of the bearing lead of the playback head. For a << $k$ also in this case the time derivative of the resultant force acting upon the playback head is proportional to the pressure distribution at the edge of the pickup contacting the carrier according to equation (5):

$$\frac{dP_{\sim}(x_o)}{dx_o} \sim -lp(x_o)$$

With the embodiment of FIG. 1 and the pressure characteristic of FIG. 4, the time waveform of the scanned voltage will be as shown in FIG. 5, which voltage has a large harmonic content.

According to the invention, the harmonics contained in such a voltage waveform are suppressed by a conveniently designed low-pass filter whose upper limit frequency is placed at the level described earlier so as to suppress as few as possible of the upper sideband frequencies of the modulated signal.

In the exemplified embodiments described above, the pressure playback head has been provided with a stylus in the form of a sliding skid made of wear-resistant material. But the relations derived are also valid for the dimensioning of a playback head without sliding skid, i.e., where the ceramic piezoelectric or magnetostrictive transducer body will contact, and move along, the surface of the record directly.

As has been mentioned at the beginning, it is expedient to use a piezoelectric ceramic body for transforming the fluctuations of the pressure on the stylus into electric voltages. Likewise, it is possible to use other transducers, e.g. piezomagnetic and magnetostrictive transducers as well as pressure-responsive semiconductors.

Insofar as concerns the circuitry for processing the output signals from the playback head transducer, FIG. 1 illustrates a lowpass filter 10 connected to transmit the output from transducer 1, while FIG. 3 illustrates the transducer 1 connected to a differentiator and/or highpass filter 11 and a lowpass filter 10 through which the output signal passes. After processing, signals can be subjected to further processing and amplification before being delivered to a suitable instrument for reconstructing the stored information, which instrument could be a television monitor and/or speaker system.

The stylus 3 in FIG. 3, if it is intended to serve for scanning frequency modulated video signals, may have a length in the direction of the groove axis of approximately 0.2 mm. Is bottom portion is wedge-shaped. The tracing edge of the stylus is rounded in a plane normal to the groove axis and has a radius of curvature of approximately 4$\mu$ in that plane. This rounded tracing edge of the wedge, forming the leading edge of the stylus, is preferably inclined at approximately 10° with respect to the undeflected record surface. The trailing edge 6 has a height of approximately 80$\mu$.

A spiral-shaped groove is disposed in the record surface and is formed so that its walls enclose an angle of approximately 140° normal to the groove axis. The groove walls present the elastically depressable relief-shaped undulations which are shaped to constitute a spatial representation of a frequency modulated oscillation. The wavelength of the cyclic undulation alternations varies between 2$\mu$ and 5$\mu$. The difference in height between a peak and a valley of the undulations is approximately 1$\mu$.

The rounded tracing edge of the wedge-shaped stylus slides upon the undulations of both groove walls and thus almost completely levels the undulations elastically. The stylus vertex, which is disposed between the leading edge 5 and the trailing edge 6, has a radius of curvature of approximately 0.2$\mu$ in a plane containing the groove axis.

The scanned signal has instantaneous frequencies between 2.75 MHz and 3.75 MHz, i.e., the frequency excursion of the scanned frequency modulated oscillations is 1 MHz. The ceramic transducer body 1 effects a proportional conversion of the alternating force exerted on it into an electrical voltage.

The upper limit frequency of the lowpass filter network 10 in FIGS. 1 and 3, i.e., the frequency at which attenuation compared to lower frequencies has increased by 3 dB, is 5 MHz. The limit frequency here lies in the vicinity of twice the lowest instantaneous recorded signal frequency of 2.75 MHz.

The highpass filter 11 shown in FIG. 3 has a lower limit frequency of 500 kHz, which lies above 50 kHz but below the lowest instantaneous recorded signal frequency of 2.75 MHz. The highpass filter consists of the capacitance of approximately 3 pF of the piezoelectric ceramic transducer body and a shunt resistance of approximately 100 kΩ. When the differentiating member is connected directly behind the ceramic body, the capacitance of the ceramic body can also form part of the differentiating member. In this case the connected shunt resistance should be a resistance of the order of magnitude of 10 kΩ.

It will be understood that the above description of the present invention is susceptible to various modifications, changes and adaptations and the same are intended to be comprehended within the meaning and range of equivalents of the appended claims.

What is claimed is:

1. In a pressure pickup including a stylus of wear-resistant material, a mechanical-electrical transducer for reproducing signals stored in the grooves of an elastically deformable record disc in the form of groove wall undulations constituting a spatial representation of the time variation of such signals, and means supporting said stylus for causing it to extend into such grooves so as to bear against the groove walls and to elastically deform the groove walls, thereby creating an elastic restoring force applied to the transducer and converted thereby into an electrical signal, the lower surface of the stylus having an outline, in the direction of the groove axis, composed of one shallow edge formed to continuously contact a plurality of undulation peaks, and one steeper edge, the edges meeting at the lowermost point of the stylus, the improvement comprising a lowpass filter connected to the output of said transducer for receiving the electrical signal produced thereby, said filter constituting means having a cutoff frequency no greater than about twice the lowest instantaneous frequency of the stored signals.

2. An arrangement as defined in claim 1 wherein the stored signals are in the form of a carrier wave angularly modulated by an information signal.

3. An arrangement as defined in claim 2 wherein the carrier wave is frequency modulated with the information signal.

4. An arrangement as defined in claim 1, further comprising a highpass filter connected to the output of said transducer for attenuating the low frequency components of the signal produced by said transducer.

5. An arrangement as defined in claim 4 wherein said highpass filter is constituted in part by the inherent capacitance of said transducer.

6. An arrangement as defined in claim 1 wherein said shallow edge of said stylus constitutes the leading edge thereof and is formed to cause the pressure applied thereto by the groove walls to increase over a distance of approximately 1 to 100 undulation wavelengths, and said steeper edge constitutes the trailing edge of said stylus and is formed to cause the pressure applied thereto by the groove walls to decrease to zero over a distance which is no greater than one-half the shortest recorded undulation wavelength.

7. An arrangement as defined in claim 6 wherein both of said edges are downwardly convex in a plane parallel to the direction of movement of said stylus relative to a groove, the radius of curvature of said leading edge being greater than three times the longest recorded wavelength to be reproduced and the radius of curvature of said trailing edge being less than one half the shortest recorded wavelength to be reproduced.

8. An arrangement as defined in claim 6 wherein, in the direction of movement of said stylus relative to a groove, said leading edge is substantially straight and formed to be inclined to the undeflected support surface, and said trailing edge is formed to be substantially perpendicular to such surface.

9. An arrangement as defined in claim 8 wherein said leading edge is formed to lie at an angle of 1° to 20° to such support surface.

10. An arrangement as defined in claim 1 wherein said transducer and said filter comprise means for converting the force on said transducer into a signal approximately proportional to the first time derivative of at least the low frequency components of the time variation of the restoring force.

11. An arrangement as defined in claim 10 wherein said transducer constitutes means for producing an electrical signal proportional to the restoring force applied thereto.

12. An arrangement as defined in claim 11, further comprising a differentiation circuit connected to said transducer for producing an output signal proportional to the time derivative of at least the low frequency components of the signal produced by said transducer.

13. An arrangement as defined in claim 12 wherein said differentiation circuit is constituted in part by the inherent capacitance of said transducer.

14. An arrangement as defined in claim 13 for use with a record disc whose stored signals are angularly modulated video signals, wherein said highpass filter has a cutoff frequency above 50 kHz and below the lowest instantaneous frequency of the angularly modulated signals.

* * * * *